3,486,826
THREE AXIS OPTICAL ALIGNMENT
APPARATUS
Donald W. Colvin and Frederick Kulick, Clearwater, Fla., assignors to Honeywell Inc., Minneapolis, Minn., a corporation of Delaware
Filed Dec. 27, 1965, Ser. No. 516,428
Int. Cl. G01b 11/26
U.S. Cl. 356—141                    4 Claims

ABSTRACT OF THE DISCLOSURE

Optical alignment sensing apparatus in which a reference beam is focused between two pairs of detectors by two cylindrical lenses if the object to which the detectors and lenses are mounted in properly orientated and also reflected by an object mounted prism between two reference detectors if the object is properly orientated.

---

The present invention pertains to optical systems and more specifically to unique and novel apparatus to detect misalignment of a member about three orthogonal axes. It should be appreciated that, although our invention is described herein with reference to a particular optical system, the principles and techniques disclosed are completely suitable for use in any optical system in which rotation or orientation of an object is to be measured.

A number of optical systems have been employed in the prior art to measure orientation about three axes. However, these prior art systems oft times involve complex techniques and delicate components to accomplish their function. In the instant invention, a relatively simple optical system is proposed which accomplishes the orientation function with a minimum of complexity. Briefly, our invention comprises an optical system to project a beam of collimated light toward the base end of a truncated Porro prism. A portion of this light is reflected from the internal surfaces of the Porro prism while the remaining portion passes through the truncated surface. That portion which passes through the truncated surface is focused by two orthogonally positioned cylindrical lenses on their respective central axes and the positions of the focused line images are monitored by two pairs of detectors. Each pair of detectors generates an output signal in response to a movement of one of the line images in either direction, thus, providing a signal indicative of a plus or minus rotation about two orthogonal axes, which are essentially perpendicular to the beam of light. Rotation about the third orthogonal axis is detected by a third pair of detectors mounted proximate to the source of light. This third pair of detectors receives therebetween the portion of the light which is internally reflected from the Porro prism, which image is rotated if the Porro prism rotates about the third orthogonal axis, which is essentially parallel to the beam of light.

Although the invention, as described herein, is shown with the outputs of the detectors going directly to an indicating means, it should be understood that the output signals may be directed to a servo mechanism to re-orientate the Porro prism and its associated apparatus or to any other mechanism which may affect or depend upon the orientation of the member in question.

Figure 1:
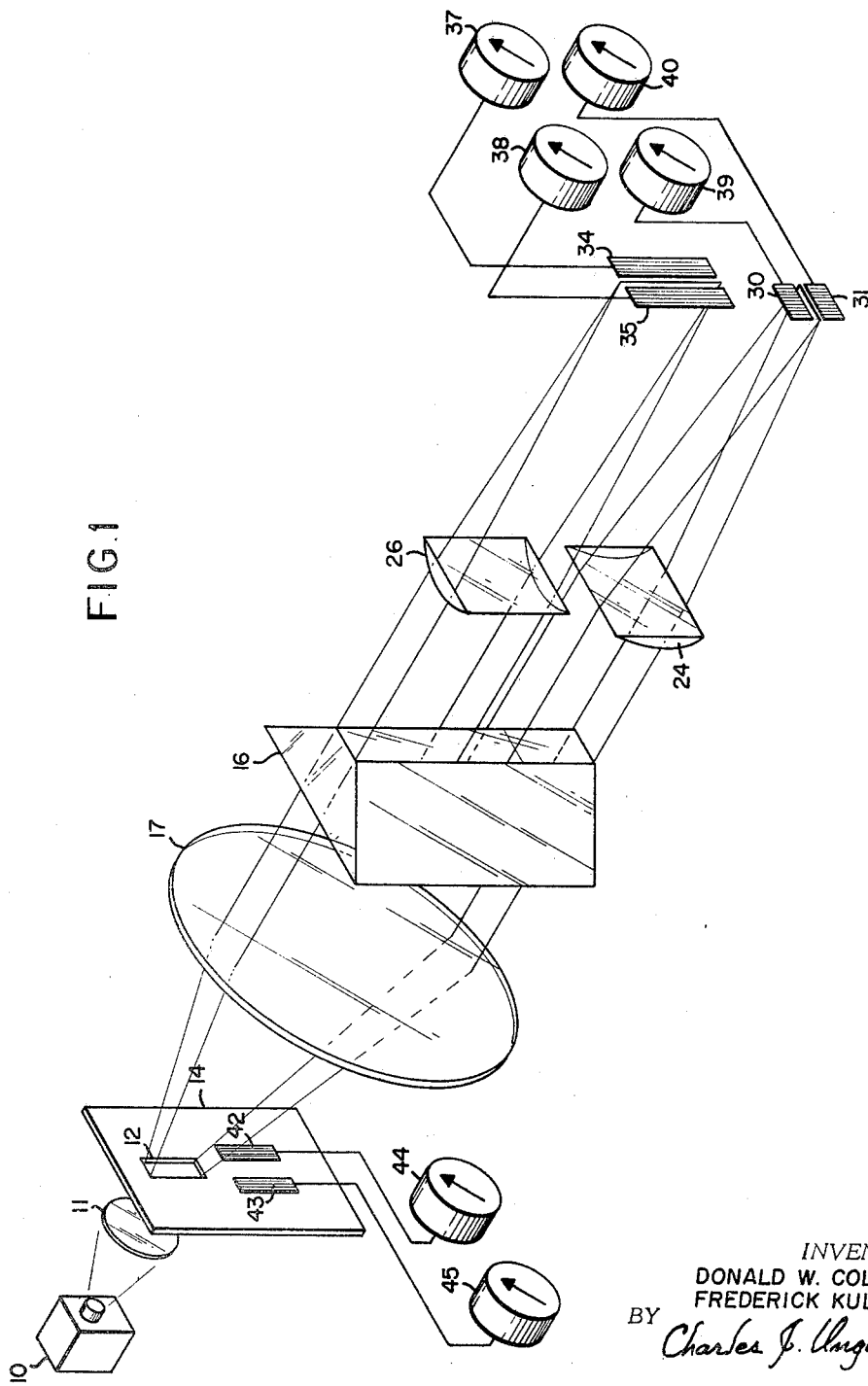
Figure 2:
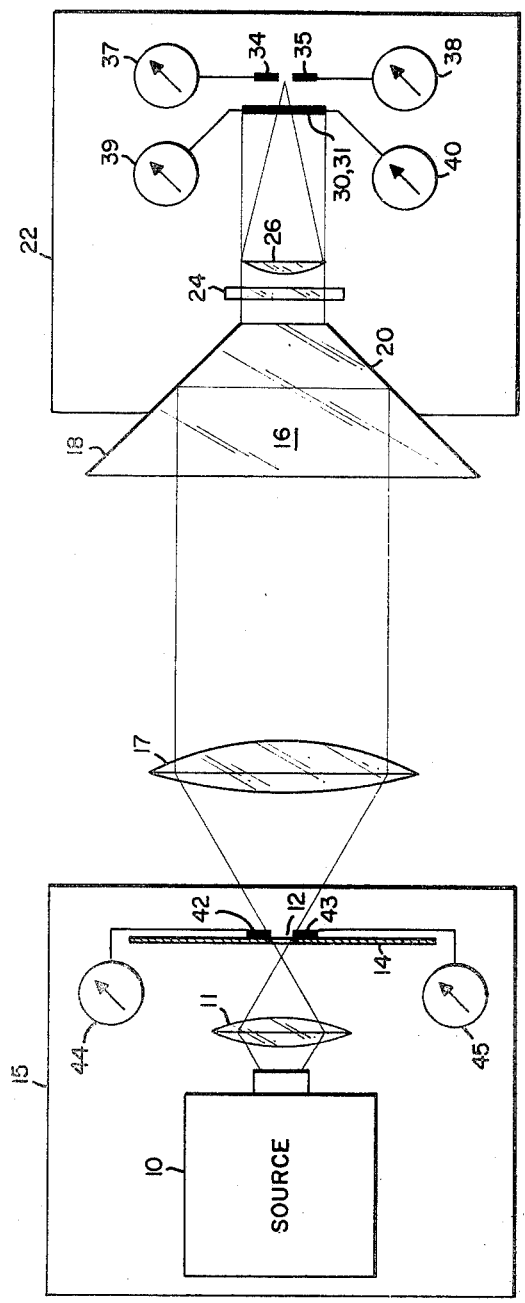

Accordingly, it is an object of the present invention to provide apparatus of a simple and reliable nature which can detect and measure misalignment about three orthogonal axes. Further objects and advantages will become apparent from the study of the following description and drawings in which:

FIGURE 1 is a perspective drawing showing the major optical elements of our invention; and FIGURE 2 is a schematic diagram showing essentially the same preferred embodiment as FIGURE 1.

For clarity and convenience, the preferred embodiment of the present invention has been shown in a perspective view and in a schematic view in FIGURES 1 and 2 respectively. Reference should be had simultaneously to FIGURES 1 and 2 for a better understanding of the invention as described in the following detailed description. The parts of FIGURE 2, which are the same as in FIGURE 1, are numbered identically.

In the drawings, a source of light 10 and a condensing lens 11 are shown which project a beam of light through an aperture 12 in a screen 14. Source 10, lens 11, and screen 14 are mounted to a common base 15. The light from source 10 is collimated by lens 17 and travels to a truncated Porro prism 16 where a portion of the light is internally reflected from two silvered orthogonal faces 18 and 20, while the remaining portion passes through the truncated surface. Porro prism 16 is mounted to a member 22 whose orientation is to be measured about three orthogonal axes. It should be understood that Porro prism 16 may be replaced by two orthogonal mirrors positioned at the locations of sides 18 and 20. Another possible variation would be to provide a hole through prism 16 from the truncated area so that the light may pass through without interference. In addition, it should be appreciated that the lens system disclosed by lenes 11 and 17 could well be a reflecting system such as a Cassegrainian or the like. Also mounted to member 22 are a pair of cylindrical lenses 24 and 26 which focus light passing through the truncated surface of Porro prism 16 as two orthogonal line images. The line image produced by cylindrical lens 24 normally falls between a pair of detectors 30 and 31. The line image produced by cylindrical lens 26 normally falls between a pair of detectors 34 and 35. Detectors 30, 31, 34, and 35 are affixed in a suitable fashion to member 22 and are operable to provide an electrical output when illuminated.

If member 22 rotates about an axis perpendicular to FIGURE 2, the line image focused by cylindrical lens 26 will impinge upon detector 34 or 35 depending upon the direction of rotation. Thus, a signal will be transmitted to indicator 37 or 38 which indicator will provide information regarding the orientation of member 22 about the vertical axis. Indicators 37 and 38 may be voltmeters or any device suitable to indicate the reception of a signal from the detectors. If member 22 rotates about an axis in the plane of FIGURE 2 perpendicular to the direction the light travels, the line image focused by cylindrical lens 24 will impinge upon detector 30 or detector 31 depending on the direction of rotation which will then generate a signal on indicator means 39 or 40. Thus, if no signal is indicated by detectors 37, 38, 39, and 40, the member 22 is correctly orientated about two orthogonal axes.

A clockwise rotation of member 22 about a vertical axis in FIGURE 2 will be indicated by indicator 38, while a counter-clockwise rotation about the vertical axis will be indicated by indicator 37. Similarly, in FIGURE 2, if the right hand side of member 22 goes down, it will be indicated by indicator 40 while, if it goes up, an indication will be read on indicator 39. If desired, the detectors 30, 31, 34, and 35 may be shaped so that increasing misalignment will impinge light on more detector surface so that the indicator maens 37, 38, 39, and 40 can give a signal indicative of the amount of misalignment. Obviously, many variations may be made to the mode of operation.

Rotation about the third orthogonal axis, the optical axis, is detected by a pair of detectors 42 and 43 mounted on screen 14 and connected respectively to a pair of indicators 44 and 45. If member 22 and, consequently, Porro prism 16 rotate about the third axis, the internally reflected image of aperture 12 will also rotate. The optical system of FIGURE 1 and FIGURE 2 is aligned so that when member 22 is in a desired reference orientation the reflected image returns between detectors 42 and 43, whereas when member 22 is not in the reference position, the returned image is rotated so as to impinge on detectors 42 and 43. Thus, provision is made to detect a misalignment about any of three orthogonal axes simultaneously.

Many modifications and alterations may be made to the apparatus disclosed without departing from the spirit and scope of the invention. For example, a group of four detectors may be affixed to screen 14 at the four corners of the returning image of aperture 12 so that information may be provided regarding the direction of rotation and also the magnitude of rotation of member 22 about the optical axis. As mentioned earlier, the outputs from the various detectors may be employed to drive servo mechanisms to reorientate member 22 in a correct attitude. Also, so that the system may better distinguish the light from source 10 from ambient illumination, a specific modulation may be imposed upon the light beam, such as an amplitude modulation, and discriminatory circuits incorporated into the indicator means 37, 38, 39, 40, 44, and 45. Also, the arrangement of the optical components described may be varied considerably depending upon the degree of accuracy required and the type of operation. In accordance, therefore, with the foregoing facts, we do not intend the present invention to be limited by the disclosure except as defined by the appended claims.

We claim:

1. Apparatus for establishing the orientation of a member about three mutually orthogonal axes comprising:
    means producing a beam of collimated light;
    a truncated Porro prism affixed to the member to receive said beam of light through its base;
    a first cylindrical lens affixed to the member and positioned so as to focus on its central axis a first portion of the light passing through the truncated surface of said Porro prism;
    a second cylindrical lens affixed to the member at right angles to said first cylindrical lens and positioned so as to focus on its central axis a second portion of the light passing through the truncated surface of said Porro prism;
    first detecting means affixed to the member and positioned to receive and measure the displacement of light from the central axis of said first lens;
    second detecting means affixed to the member in a position to receive and measure the displacement of light from the central axis of said second lens; and
    third detecting means positioned to detect rotation of the beam image which is internally reflected from the orthogonal sides of said truncated prism.

2. An optical system to detect misalignment of a member about three mutually orthogonal axes comprising:
    means producing a beam of collimated light;
    a truncated Porro prism affixed to the member to receive said beam of light through its base;
    a first cylindrical lens affixed to the member and positioned so as to focus a first portion of the light passing through the truncated surface of said Porro prism as a first line image;
    a second cylindrical lens affixed to the member and positioned so as to focus a second portion of the light passing through the truncated surface of said Porro prism as a second line image perpendicular to said first line image;
    a first pair of detectors affixed to the member in a position to receive therebetween said line image from said first lens, a movement of the image in a first direction generating a signal on said first pair of detectors;
    a second pair of detectors affixed to the member in a position to receive said line image therebetween from said second lens, movement of the image in a second direction perpendicular to said first direction generating a signal on said second pair of detectors; and
    a third pair of detectors positioned to detect rotation of the beam image internally reflected from the orthogonal sides of said truncated Porro prism.

3. An optical system to detect misalignment of a member about three mutually orthogonal axes comprising:
    a source of collimated light;
    a screen, including an aperture to define a beam of light and a pair of detectors spaced apart in a parallel relation so as to receive therebetween a beam of light;
    a truncated Porro prism affixed to the member having its base toward the screen, a portion of said beam of light being internally reflected from the orthogonal faces of said Porro prism and return between the screen mounted pair of detectors when said prism is orientated correctly about the optical axis;
    a pair of cylindrical lenses affixed to the member so as to receive light through the truncated surface of the Porro prism and focus two orthogonal line images therefrom, movement of the two line images being indicative of rotation of the member about the two axes perpendicular to the optical axis; and
    two pairs of detectors positioned to receive the line images therebetween, one image for each pair, so as to detect movement of the two images.

4. An optical system to detect misalignment of a member about three mutually orthogonal axes comprising in the following order along an optical axis;
    a source of collimated light;
    a screen, including an aperture to define a substantially rectangular beam of light and a pair of substantially rectangular detectors spaced apart in parallel relation so as to receive therebetween a rectangular beam of light;
    a truncated Porro prism affixed to the member having its base toward said screen, a portion of said rectangular beam of light being internally reflected from the orthogonal faces of said Porro prism and returned between screen mounted pair of detectors when said prism is orientated correctly about the optical axis;
    a pair of cylindrical lenses affixed to the member located so as to receive two different portions of the light passing through the truncated surface of said Porro prism and operable to focus each portion in a line image, the line images from the two cylindrical lenses being orthogonal, movement of the two line images being indicative of rotation of the member about the two axes perpendicular to the optical axis; and
    two pairs of substantially rectangular detectors operable to receive the line images therebetween, one image for each pair, so as to detect movement of the two line images.

References Cited

UNITED STATES PATENTS

| | | |
|---|---|---|
| 2,563,892 | 8/1951 | Waller et al. |
| 2,641,712 | 6/1953 | Kircher _____ 250—203 X |
| 2,948,890 | 8/1960 | Barth et al. |
| 3,197,643 | 7/1965 | Morris. |
| 3,241,430 | 3/1966 | Kulick. |
| 3,369,444 | 2/1968 | Patrignani. |

RONALD L. WIBERT, Primary Examiner

J. ROTHENBERG, Assistant Examiner

U.S. Cl. X.R.

356—147, 150, 152